Figure 1:
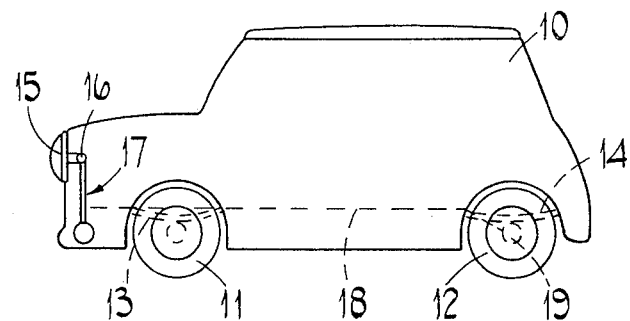

United States Patent [19]
Martin

[11] 3,955,080
[45] May 4, 1976

[54] MOTOR VEHICLE WITH HEADLAMP TILTING MECHANISM

[75] Inventor: Frederick Raymond Patrick Martin, Kent, England

[73] Assignee: Lucas Electrical Company Limited, Birmingham, England

[22] Filed: Mar. 21, 1975

[21] Appl. No.: 561,006

[30] Foreign Application Priority Data
Mar. 30, 1974 United Kingdom............... 14220/74

[52] U.S. Cl. ........................... 240/7.1 LJ; 240/62.6
[51] Int. Cl.² ........................................ B60Q 1/10
[58] Field of Search ............... 180/82 R; 240/7.1 R, 240/7.1 LJ, 62 R, 8.25, 62.6

[56] References Cited
UNITED STATES PATENTS

| | | | |
|---|---|---|---|
| 3,316,397 | 4/1967 | Yssel | 240/7.1 LJ |
| 3,614,416 | 10/1971 | Fleury | 240/8.25 |
| 3,697,741 | 10/1972 | Yssel | 240/7.1 LJ |

FOREIGN PATENTS OR APPLICATIONS

| | | | |
|---|---|---|---|
| 1,358,632 | 3/1964 | France | 240/7.1 LJ |

*Primary Examiner*—Kenneth H. Betts
*Attorney, Agent, or Firm*—Holman & Stern

[57] ABSTRACT

The motor vehicle comprises a body, a pair of headlamps which are mounted on a common cross rod angularly movable relative to the body, and a headlamp tilting mechanism. The mechanism comprises a tensioned cable secured at one end to an axle housing of the motor vehicle and at its opposite end to a spring arm. An outer sleeve over the cable abuts against the underside of the body. The spring arm is clamped at one of its ends to the cross rod and a further spring arm is also clamped to the cross rod and has its free end urged into abutment with a stop fixed relative to the body. The cable is secured to the end of the spring arm which is remote from cross rod and the cable biases the further arm into engagement with the stop. The provision of the spring arms serves to reduce the amount of angular movement imparted to the cross rod by the cable when changes in the attitude of the vehicle body relative to the wheels occurs under changing conditions of load carried by the body.

5 Claims, 2 Drawing Figures

U.S. Patent  May 4, 1976  3,955,080

MOTOR VEHICLE WITH HEADLAMP TILTING MECHANISM

This invention relates to a motor vehicle with a headlamp tilting mechanism for effecting tilting movement of the headlamps in a vertical plane in accordance with changes in the attitude of a body of the vehicle relative to wheels thereof, in order to maintain light beams projected by the headlamps, in use, at the desired level.

In a previously proposed headlamp tilting mechanism, a signal proportional to the attitude of the vehicle body relative to the rear wheels thereof has been produced by means of a cable arrangement wherein one end of the cable is secured to an unsprung or unsuspended part of the motor vehicle, e.g. an axle housing thereof, and an outer sleeve through which the cable passes is arranged to be acted upon by a sprung or suspended part of the motor vehicle, e.g. the body. Changes in the attitude of the vehicle body relative to the rear wheels cause the outer sleeve to act on the cable so as to decrease or increase the effective length thereof. Thus, the change in the position of an end of the cable opposite to that which is secured to the unsprung part of the motor vehicle is used to control the tilt of the headlamps. However, the movement of the said opposite end of the cable with changes in the attitude of the vehicle body relative to the wheels thereof is such that too great a movement of the headlamps will be provided if the said opposite end of the cable were to be attached directly to a lever secured to an angularly movable rod on which the headlamps are mounted It is an object of the present invention to provide a headlamp tilting mechanism in which the above disadvantage is obviated or mitigated.

According to the present invention, there is provided a motor vehicle comprising a body, a pair of headlamps, a rod mounted for movement on the body and connected with the headlamps so that movement of the rod effects tilting movement of the headlamps in a vertical plane, and a mechanism for effecting movement of said rod in response to changes in the attitude of the body relative to wheels of the vehicle, said mechanism including first and second resilient means, each being secured at one of its ends with respect to the rod, an opposite end of the first resilient means being engaged with an abutment member fixed relative to the body, an opposite end of the second resilient means being biassed by the remainder of the mechanism in a direction in which the first resilient means engaging the abutment means is stressed, whereby changes in the biassing applied by the remainder of the mechanism to the second resilient means are partially absorbed by balancing of the stresses in the first and second resilient means so that a reduced signal is transmitted to the rod by the mechanism.

Preferably, each resilient means is a spring arm.

In one embodiment, the spring arms are separate and said one end of each arm is secured to and supported by the rod.

In another embodiment, the two spring arms are formed as two limbs of a U-shaped spring, the limbs being interconnected at said one end of the arm.

Conveniently, the mechanism is applicable to the type of motor vehicle in which the rod is disposed on the body to extend transversely thereof and is angularly movable relative thereto, with the headlamps being mounted on the rod.

Figure 2:
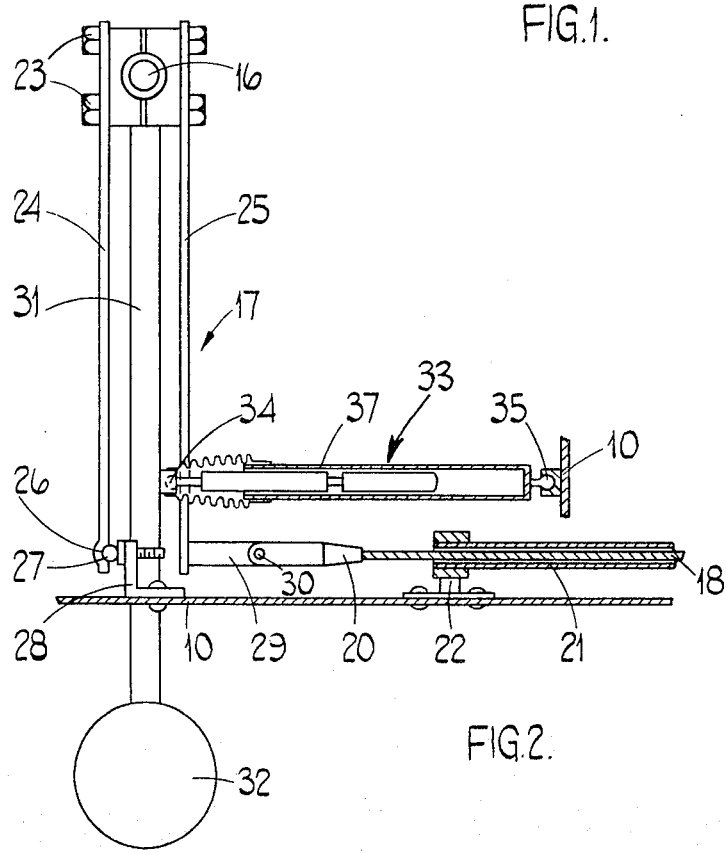

An embodiment of the present invention will now be described, by way of example, with reference to the accompanying drawing, in which:

FIG. 1 is a schematic side view of a motor vehicle according to the present invention, and FIG. 2 is an elevation, on a larger scale, of part of the motor vehicle illustrated in FIG. 1.

Referring to the drawing, the motor vehicle comprises a body 10, front and rear wheels 11 and 12, respectively, and front and rear suspensions 13 and 14, respectively, serving to support resiliently or suspend the body 10 on the wheels 11 and 12. The motor vehicle further comprises a pair of headlamps 15 (only one shown) which are mounted upon a common cross rod 16 which extends transversely across the front of the motor vehicle body 10 and is angularly movable relative thereto. Connected to the cross rod 16 is a mechanism 17 for effecting angular movement of the cross rod 16 in response to changes in the attitude of the vehicle body 10 relative to the rear wheels 12 to effect headlamp levelling.

The mechanism 17 includes a cable 18 which is secured at one end to an axle housing 19 of the motor vehicle. The axle housing 19 is an unsprung or unsuspended part of the motor vehicle. At its opposite end, the cable 18 is secured to a link 20 an outer sleeve 21 surrounds cable 18 for the majority of its length and is anchored at each end to the vehicle body 10, only one anchor 22 is illustrated. The outer surface of sleeve 21 engages intermediate its ends with a part (not shown) which is fixed to the vehicle body 10, i.e. a sprung or suspended part of the vehicle.

Secured by means of bolts 23 to the cross rod 16 are one end of each of first and second spring arms 24, 25 respectively. The first and second spring arms 24 and 25 form, effectively, two limbs of a U-shaped spring, the limbs being interconnected via the bolts 23 at said one end of the arms 24 and 25. The first spring arm 24, at its opposite end, is provided with a cupped recess 26 for engagement with an abutment 27 which is adjustably mounted on a bracket 28 secured to the vehicle body 10. The opposite end of the second arm 25 has a projection 29 extending therefrom. The projection 29 is secured by means of a horizontal pivot 30 to link 20. Also mounted on cross rod 16 is an arm 31 which carries a pendulum weight 32 at a lower end thereof. Intermediate the ends of the arm 31 a damper unit 33. At its end opposite to ball and socket joint 34, the damper unit 33 is secured to the body 10 through the intermediary of a further ball and socket joint 35. The damper unit 33 forms no part of the present invention and will be described in no further detail herein except to state that it permits relatively long term changes in the angular position of arm 31 but prevents short term changes therein such as might occur during passage of the motor vehicle, in use, over rough roads.

In use, the loading on the rear of the vehicle body 10 relative to the rear wheels 12 is sensed by the assembly of cable 18 and sleeve 21 so that the end of cable 18 which is attached to link 20 adopts a position corresponding to the attitude, at any instant, of the vehicle body relative to the rear wheels 12. Under all conditions of load, the cable 18 is tensioned so that the spring arm 25 is biassed in an anti-clockwise direction about the axis of cross rod 16 to bring the recess 26 in the first spring arm 24 into engagement with abutment 27. In this manner, both spring arms 24 and 25 are stressed and the stresses therein are balanced so that the cross rod 16 adopts an angular position corresponding to the position adopted by the end of the cable 18 remote from axle housing 19. If the rear of the vehicle body 10 is loaded, the tension in cable 18 increases and thus increases the stresses applied to the arm 25. The increased stress causes a deflection in the spring arm 25 until the stresses in the arms 24 and 25 are balanced. This balancing of stresses brings about a rotation of cross rod 16 in the anti-clockwise direction as viewed in FIG. 2. This causes a downward tilting of the headlamps 15. However, the amount of rotation of cross rod 16 occurs is less than that which would have occured if link 20 were connected with cross rod 16 via a rigid lever rather than via spring arm 25. The amount of rotary movement of cross rod 16 can be set by appropriate adjustment of the position of abutment 27 relative to brackets 28 so that the mechanism 17 can be set up to provide the required degree of tilt of the headlamps 15 for any given change in the attitude of the vehicle body 10 relative to the rear wheels 12. When the load on the rear of the vehicle body 10 is lightened, the tension within cable 18 decreases and relieves to a certain extent the stress in spring arm 25 with a result that the cross rod 16 moves in a clockwise direction about its axis to balance the stresses in arms 25 and 24. In this manner, the headlamps 15 are tilted upwardly.

Under heavy braking conditions, the pendulum weight 32 moves to the left relative to cross rod 16 as viewed in FIG. 2. Such movement of the weight 32 causes the cross rod 16 to move in a clockwise direction about its axis to effect upward tilting of the headlamps 15 to compensate for dipping of the front of the motor vehicle body under braking conditions. The damper unit 33 serves, as mentioned above, to damp movements of the pendulum so that the vibration thereof does not occur.

Under acceleration conditions, the pendulum weight 32 moves rearwardly relative to cross rod 16 to effect anti-clockwise movement of the rod 16 about its axis so that downward tilting of the headlamps occurs under acceleration conditions where the front of the vehicle body 10 lifts. It will also be appreciated that, under braking and acceleration conditions, some effects of the change in attitude of the vehicle body 10 will be sensed by the cable 18 and a signal will be passed, although the duration of the acceleration or braking signal is not generally sufficient to have an appreciable effect on the effective length of cable 18 because the cable 18 is mainly designed to be responsive to relatively long term variations such as occur when the load carried by the rear of the vehicle body is altered.

I claim:

1. A motor vehicle comprising a body, a pair of headlamps, a rod mounted for movement on the body and connected with the headlamps so that movement of the rod effects tilting movement of the headlamps in a vertical plane, and a mechanism for effecting movement of said rod in response to change in the attitude of the body relative to wheels of the vehicle, said mechanism including first and second resilient means, each being secured at one of its ends with respect to the rod, an opposite end of the first resilient means being engaged with an abutment member fixed relative to the body, an opposite end of the second resilient means being biassed by the remainder of the mechanism in a direction in which the first resilient means engaging the abutment means is stressed, whereby changes in the biassing applied by the remainder of the mechanism to the second resilient means are partially absorbed by balancing of the stresses in the first and second resilient means so that a reduced signal is transmitted to the rod by the mechanism.

2. A motor vehicle as claimed in claim 1, wherein each resilient means is a spring arm.

3. A motor vehicle as claimed in claim 2, wherein the spring arms are separate and said one end of each arm is secured to and supported by the rod.

4. A motor vehicle as claimed in claim 2, wherein the two spring arms are formed as two limbs of a U-shaped spring, the limbs being interconnected at said one end of the arm.

5. A motor vehicle as claimed in claim 1, wherein the rod is disposed on the body to extend transversely thereof and is angularly movable relative thereto, with the headlamps being mounted on the rod.

* * * * *